US009338688B2

(12) United States Patent
Kim et al.

(10) Patent No.: US 9,338,688 B2
(45) Date of Patent: May 10, 2016

(54) METHOD FOR TRANSMITTING DATA AND USER EQUIPMENT

(75) Inventors: Taehyeon Kim, Anyang-si (KR);
Laeyoung Kim, Anyang-si (KR);
Jaehyun Kim, Anyang-si (KR);
Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 125 days.

(21) Appl. No.: 14/007,318

(22) PCT Filed: Apr. 2, 2012

(86) PCT No.: PCT/KR2012/002468
§ 371 (c)(1),
(2), (4) Date: Sep. 24, 2013

(87) PCT Pub. No.: WO2012/138091
PCT Pub. Date: Oct. 11, 2012

(65) Prior Publication Data
US 2014/0022898 A1    Jan. 23, 2014

Related U.S. Application Data

(60) Provisional application No. 61/472,151, filed on Apr. 5, 2011, provisional application No. 61/477,611, filed on Apr. 21, 2011, provisional application No. 61/499,115, filed on Jun. 20, 2011, provisional application No. 61/502,340, filed on Jun. 29, 2011, provisional application No. 61/540,483, filed on Sep. 28, 2011.

(30) Foreign Application Priority Data

Mar. 30, 2012    (KR) ..................... 10-2012-0033488

(51) Int. Cl.
*H04L 29/08*    (2006.01)
*H04W 28/02*    (2009.01)
(Continued)

(52) U.S. Cl.
CPC ....... *H04W 28/0289* (2013.01); *H04L 12/5692* (2013.01); *H04W 8/22* (2013.01); *H04W 88/06* (2013.01)

(58) Field of Classification Search
None
See application file for complete search history.

(56) References Cited

U.S. PATENT DOCUMENTS

2003/0114158 A1* 6/2003 Soderbacka et al. .......... 455/436
2009/0227228 A1* 9/2009 Hu et al. ....................... 455/406
(Continued)

FOREIGN PATENT DOCUMENTS

KR    10-2009-0070947    7/2009

OTHER PUBLICATIONS

Motorola, "UE behavior when receiving ISRP from VPLMN and HPLMN," 3GPP TSG SA WG2 Meeting #81, S2-104853, Oct. 2010, 6 pages.*

(Continued)

*Primary Examiner* — Fan Ng
(74) *Attorney, Agent, or Firm* — Lee, Hong, Degerman, Kang & Walmey; Jonathan Kang; Michael Monaco

(57) ABSTRACT

The present invention provides a method for a user equipment for supporting a multitude of radio access technologies. The method includes receiving information on an inter-system routing policy from a server. The information includes a filter rule information. The filter rule information includes at least a domain information or a content type information, and a list which is organized according to the priority of access technologies or access networks which are supported by the user equipment. The method further includes transmitting a data traffic to be transmitted, by using at least one access technology or a network that is decided according to the filter rule information.

8 Claims, 12 Drawing Sheets

(51) Int. Cl.
*H04W 8/22* (2009.01)
*H04L 12/54* (2013.01)
*H04W 88/06* (2009.01)

(56) References Cited

U.S. PATENT DOCUMENTS

| | | | |
|---|---|---|---|
| 2010/0208698 A1 | 8/2010 | Lu et al. | |
| 2011/0035495 A1* | 2/2011 | Ekstrom et al. | 709/225 |
| 2012/0026933 A1* | 2/2012 | Aso | H04L 12/5692 370/315 |
| 2012/0188949 A1* | 7/2012 | Salkintzis et al. | 370/329 |
| 2013/0188491 A1* | 7/2013 | Ludwig et al. | 370/235 |

OTHER PUBLICATIONS

Frei, et al., "Improvements to Inter System Handover in the EPC Environment," NTMS 2011 4th IFIP International Conference, IEEE Xplore, Feb. 2011, 5 pages.

Nokia Siemens Networks, et al., "UE evaluation of ISRP rules and flow descriptions," 3GPP TSG-CT WG1 Meeting #70, C1-110923, Feb. 2011, 12 pages (relevant portion: p. 3).

Research in Motion UK Ltd., et al., "24.302 procedures for Inter-System Routing Policies (ISRP)," 3GPP TSG-CT WG1 Meeting #65, C1-102797-draft, Jun. 2010, 11 pages (relevant portions: pp. 2, 4 and 6-9).

Qualcomm Incorporated, "ANDSF ISRP policies based on application throughput," 3GPP TSG SA WG2 Meeting #80, S2-103555, XP050458587, Aug. 2010, 5 pages.

Qualcomm Incorporated, et al., "On the need of ANDSF extensions for traffic identification," 3GPP TSG SA WG2 Meeting #83, TD S2-110477, SA WG2 Temporary Document, S2-110477, XP050523703, Feb. 2011, 4 pages.

European Patent Office Application Serial No. 12768305.0, Search Report dated Aug. 13, 2014, 7 pages.

Frei, et al., "Improvements to Inter System Handover in the EPC Environment," NTMS 2011 4th IFIP International Conference, IEEE, Feb. 2011, 5 pages.

Korean Intellectual Property Office Application Serial No. 10-2012-0033488, Office Action dated Oct. 31, 2013, 4 pages.

\* cited by examiner

METHOD FOR TRANSMITTING DATA AND USER EQUIPMENT

CROSS-REFERENCE TO RELATED APPLICATIONS

This application is the National Stage filing under 35 U.S.C. 371 of International Application No. PCT/KR2012/002468, filed on Apr. 2, 2012, which claims the benefit of earlier filing date and right of priority to Korean Application No. 10-2012-0033488, filed on Mar. 30, 2012, and also claims the benefit of U.S. Provisional Application Ser. Nos. 61/472,151 filed on Apr. 5, 2011, 61/477,611, filed on Apr. 21, 2011, 61/499,115, filed on Jun. 20, 2011, 61/502,340, filed on Jun. 29, 2011, and 61/540,483, filed on Sep. 28, 2011, the contents of which are all incorporated by reference herein in their entirety.

TECHNICAL FIELD

The present invention relates to a server responsible for a control plane within a mobile communication network and a method of the server controlling service.

BACKGROUND ART

3GPP for regulating the technical standards of a 3rd mobile communication system has started researches on Long Term Evolution/System Architecture Evolution (LTE/SAE) technology as part of efforts to optimize and improve the performance of 3GPP technologies from the end of the year 2004 in order to handle several forums and new technology related to a 4th mobile communication.

SAE that has been in progress based on 3GPP SA WG2 is research regarding network technology for purposes of determining the structure of a network and supporting mobility between heterogeneous networks, simultaneously with the LTE task of a 3GPP TSG RAN and is one of the recent important standardization issues of 3GPP. In SAE, a task has been in progress for the purpose of an optimized packet-based system with minimized transmission delay through the further improved data transfer capability as a task for developing the 3GPP system into a system that supports various radio access technologies based on an IP.

An SAE higher level reference model defined in 3GPP SA WG2 includes a non-roaming case and roaming cases including various scenarios, and reference can be made to 3GPP standard document TS 23.401 and TS 23.402 for detailed contents of the SAE higher level reference model. A simple reconfiguration of the SAE higher level reference model is shown in a network configuration of FIG. 1.

FIG. 1 shows the structure of an evolved mobile communication network.

One of the greatest characteristics of the network configuration of FIG. 1 is that the network configuration is based on the eNodeB of an evolved UTRAN and a 2 tier model of a gateway of a core network. An eNodeB 20 includes the functions of the NodeB and RNC of an existing UMTS system although not precisely matched, and the gateway can be seen to have the SGSN/GGSN functions of the existing system.

Another important characteristic is that a control plane and a user plane between an access network and a core network are exchanged through different interfaces. In the existing UMTS system, one Iu interface is present between the RNC and the SGSN. In contrast, in this network configuration, a Mobility Management Entity (MME) 51 responsible for the processing of control signals is separated from a gateway (GW), and thus an S1-MME and two S1-U interfaces are separately used. The GW include a Serving-GW (hereinafter referred to as an 'S-GW') 52 and a Packet Data Network GW (hereinafter referred to as a 'PDN-GW' or a 'P-GW') 53.

FIG. 2 is a diagram showing a relationship between an (e)NodeB and a Home (e)NodeB.

In the 3rd or 4th mobile communication system, attempts to increase the cell capacity continue to be made in order to support high-capacity service and bidirectional service, such as multimedia content and streaming.

That is, as various high-capacity transmission techniques are demanded in line with the development of communication and the spread of multimedia technology, there is a method of allocating more frequency resources as a method of increasing the radio capacity, but to allocate more frequency resources to a plurality of users using limited frequency resources is limited.

In order to increase the cell capacity, there has been an approach for using a higher frequency band and reducing cell coverage. If a cell having small cell coverage, such as a pico cell, is used, there is an advantage in that more information can be transferred because a band higher than the frequency used in the existing cellular systems can be used. However, there is a disadvantage in that costs are high because more base stations must be installed in the same area.

There has recently been proposed a femto base station, such as a Home (e)NodeB 30, from among approaches for increasing the cell capacity using a small cell as described above.

The Home (e)Node 30 started being researched on the basis of RAN WG3 of a 3GPP Home (e)NodeB and has recently been researched in earnest even in SA WG.

An (e)NodeB 20 shown in FIG. 2 can correspond to a macro base station, and the Home (e)NodeB 30 shown in FIG. 2 can become a femto base station. This specification is described based on the terms of 3GPP, and an (e)NodeB is used when describing a NodeB or an eNodeB. Furthermore, the Home (e)NodeB is used when describing both a Home NodeB and a Home eNodeB.

Interfaces indicated by dotted lines are for transmitting control signals between the (e)NodeB 20 and the Home (e)NodeB 30, and the MME 510. Furthermore, interfaces indicated by solid lines are for transmitting the data of a user plane.

FIG. 3 shows problems according to the prior art.

As shown in FIG. 3, if traffic is overloaded or congested in an interface between an (e)NodeB 20 and an S-GW 52 or traffic is overloaded or congested in an interface between an Home (e)NodeB 30 and the S-GW 52, downlink data toward UE 10 or upload data from the UE 10 is not correctly transmitted, resulting in fail.

Or, if interface between the S-GW 52 and a PDN-GW 53 or an interface between the PDN-GW 53 and an Internet Protocol (IP) service network of a mobile communication service provider is overloaded or congested, downlink data toward the UE 10 or upload data from the UE 10 is not correctly transmitted, resulting in fail.

Furthermore, when UE performs a handover from a current cell from which the UE receives service to another cell, there is a problem in that the service of the UE is dropped if another cell has been overloaded.

In order to solve the problems, mobile communication service providers have changed the S-GW 52 and the PDN-GW 53 to an S-GW and a PDN-GW having a high capacity or have increased new equipment. However, there is a disadvantage in that high costs are necessary. Furthermore, there is a disadvantage in that the S-GW and the PDN-GW having a high capacity or the new equipment is shortly overloaded because the amount of transmitted and received data is increased by geometrical progression.

Meanwhile, there have been proposed various schemes for optimizing the S-GW 52 and the PDN-GW 53 without increasing a mobile communication network as described above. For example, there has been proposed technology in which in a macro access network, specific IP traffic (e.g., Internet service) of UE is transmitted through a selected optimum path, and in a femto access network (e.g., a Home (e)NB), the specific IP traffic is offloaded to a path through the nodes of a public network not a mobile communication network, that is, a wired network, without transmitting and receiving the specific IP traffic to and from a path through a mobile communication network (i.e., selected IP traffic offload).

FIG. 4 shows a concept of Selected IP Traffic Offload (SIPTO).

FIG. 4 illustratively shows a mobile communication system, such as an Evolved Packet System (EPS). The EPS system includes an (e)NodeB 20, an MME 51, an S-GW 52, and a P-GW 53. Furthermore, a Home (e)NodeB 30 is shown.

As shown, in Selected IP Traffic Offload (SIPTO) technology, specific IP traffic (e.g., Internet service) of UE 10 is offloaded to the nodes of a wired network 70 without passing through the nodes within the IP service network 60 of a mobile communication service provider.

For example, when the UE 10 receives grant to access the (e)NodeB 20 or the Home (e)NodeB 30, the UE 10 can generate a session that passes through the wired network 70, such as a public telecommunication network, through the (e)NodeB 20 or the Home (e)NodeB 30 and perform IP network service through the session. Here, service provider policy and subscription information can be taken into consideration.

In order for the session to be generated as described above, a gateway installed in a location close to the (e)NodeB 20 or the Home (e)NodeB 30 may be used as a local gateway responsible for some of the functions of a GGSN in the case of a gateway, that is, a UMTS, or a local gateway responsible for some of the functions of a PDN Gateway (P-GW) in the case of an EPS.

Such a local gateway is called a local GGSN or a local P-GW. The function of the local GGSN or the local P-GW is similar to that of the GGSN or P-GW.

As described above, SIPTO technology has proposed a concept in which the data of UE is offloaded to a wired network, such as a public telecommunication network, through the (e)NodeB 20 or the Home (e)NodeB 30.

DISCLOSURE OF THE INVENTION

As described above, the prior art has proposed a concept in which the data of UE transmitted through one IP interface (Wi-Fi access or APN) is entirely offloaded to a wired network. However, a problem in that a user's experience is deteriorated may be caused because a real-time property is not guaranteed depending on the attributes of data when the data is offloaded to a wired network.

Or, a problem in that reliability is not guaranteed may be caused because the data of UE is offloaded to a wired network although the data requires high reliability.

Accordingly, an object of one disclosure of the present invention is to solve the above-described problems.

In order to achieve the above object, this specification provides a method in user equipment supporting multiple radio access technology. The method may include receiving information on an inter-system routing policy from a server. The information may include filter rule information, and the filter rule information may include one or more of domain information and content type information and a list in which access technologies or access networks supported by the user equipment are classified according to priorities. The method may include transmitting data traffic to be transmitted using one or more access technologies or networks determined based on the filter rule information. Here, data traffic to be transmitted through the any one access technology or network may correspond to data to be transferred using an Access Point Name (APN) defined in the routing policy.

The access technology or the access network may be either a mobile communication network or a Wi-Fi network.

The server may be an Access Network Discovery and Selection Function (ANDSF) server.

The transmitting step may include checking packets of the data to be transmitted; classifying the checked data packets according to the filter rule information; and sending the classified data using the access technologies.

The data traffic to be transmitted through the any one access technology or network may correspond to data traffic that is matched with the content type or matched with the domain information.

The filter rule information may be defined according to each filter set of IP flows.

Meanwhile, this specification also provides a user equipment supporting multiple radio access technology. The user equipment may include a reception unit configured to receive information about an inter-system routing policy from a server. The information may include filter rule information, and the filter rule information may include one or more of domain information and content type information and a list in which access technologies or access networks supported by the user equipment are classified according to priorities. The user equipment may further include a transmission unit configured to transmit data traffic to be transmitted using one or more access technologies or networks determined based on the filter rule information. The data traffic transmitted through the any one access technology or network may correspond to data transferred using an Access Point Name (APN) defined in the routing policy.

In accordance with the disclosure of this specification, UE can efficiently offload traffic according to several types of access. That is, in accordance with the disclosure of this specification, traffic can be effectively offloaded according to several types of access using the type of content type or a media type.

BRIEF DESCRIPTION OF THE DRAWINGS

FIG. 5 is an exemplary diagram showing an example of IFOM technology.

MODES FOR CARRYING OUT THE PREFERRED EMBODIMENTS

Figure 1:
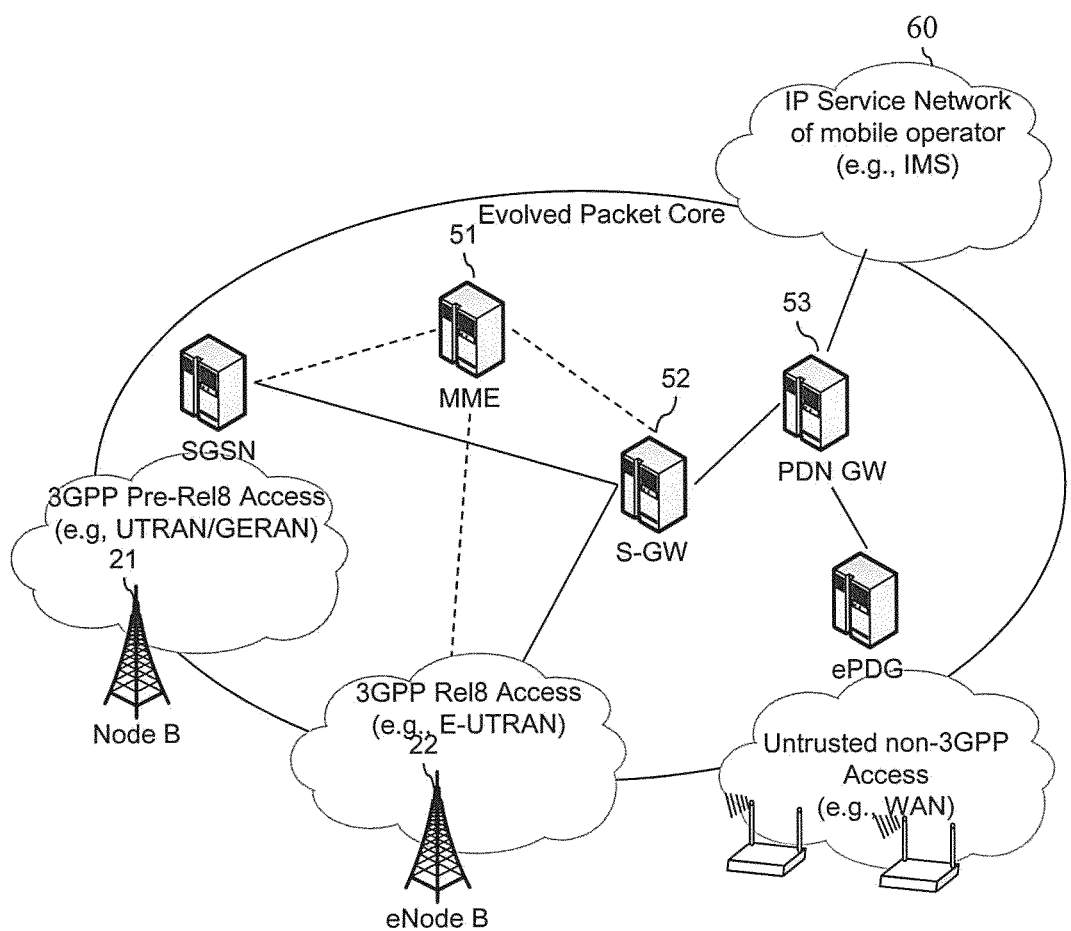
FIG. 1 shows the structure of an evolved mobile communication network.
Figure 2:
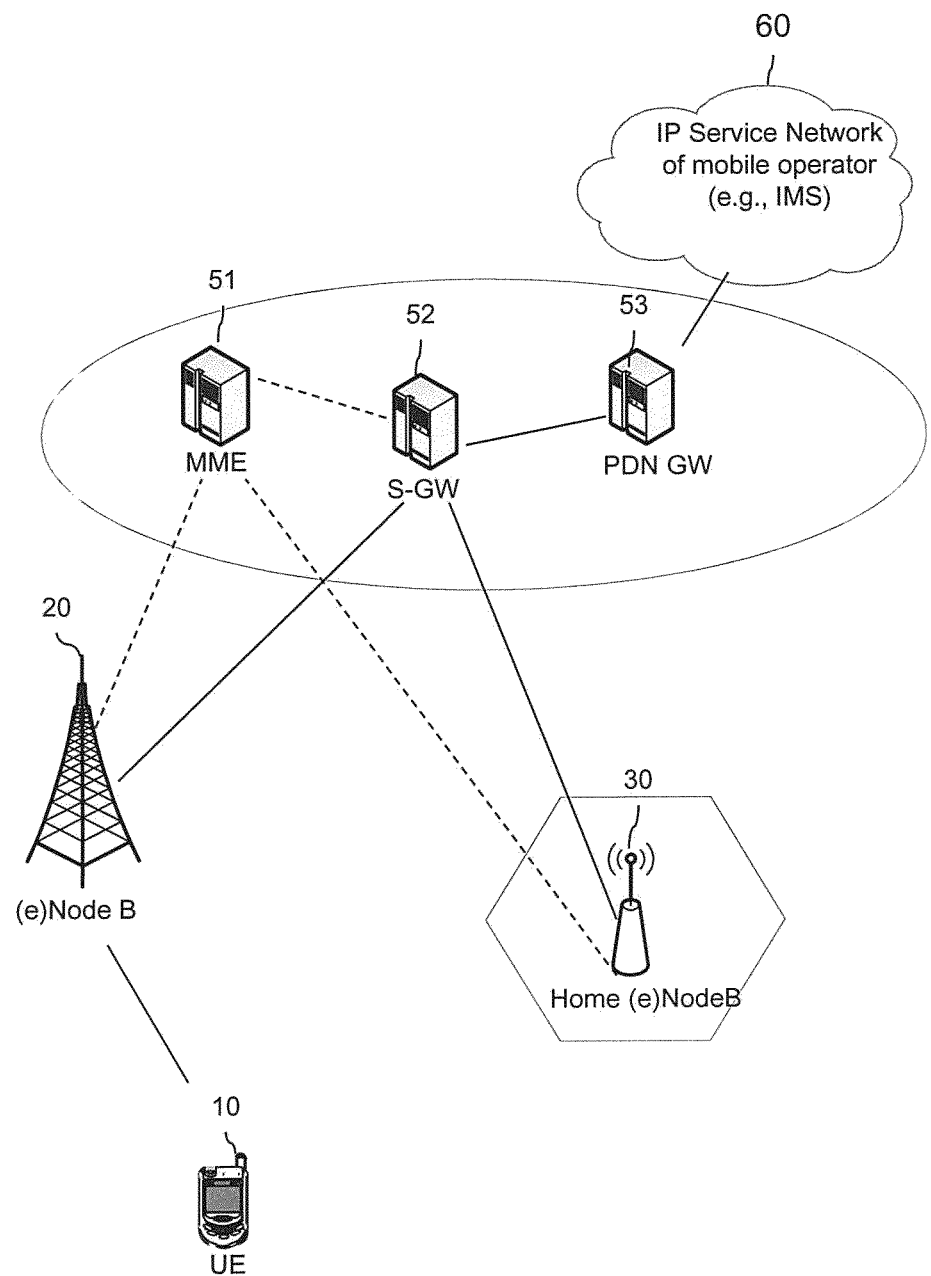
FIG. 2 is a diagram showing a relationship between (e)NodeB and Home (e)NodeB.
Figure 3:
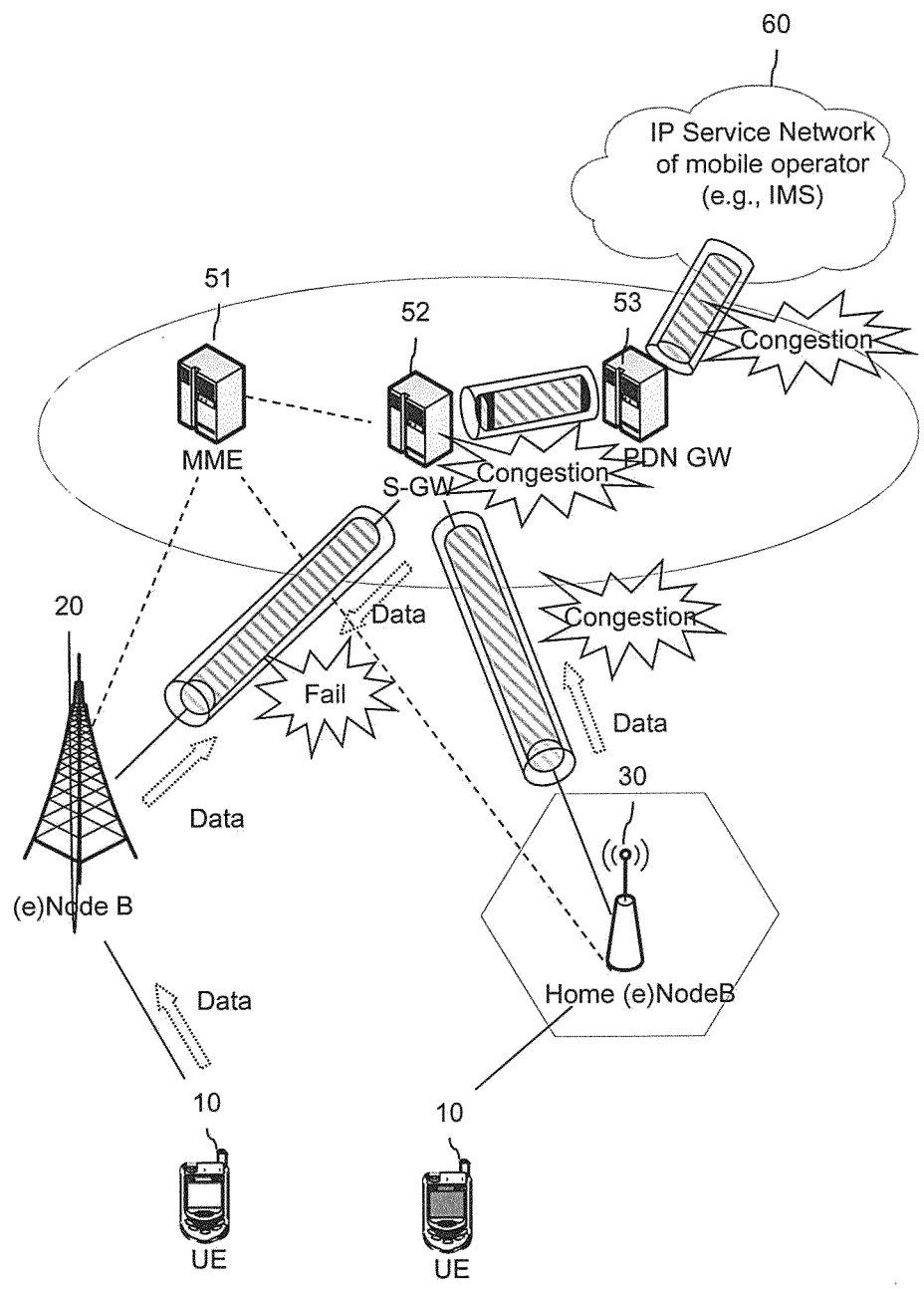
FIG. 3 shows problems according to the prior art.
Figure 4:
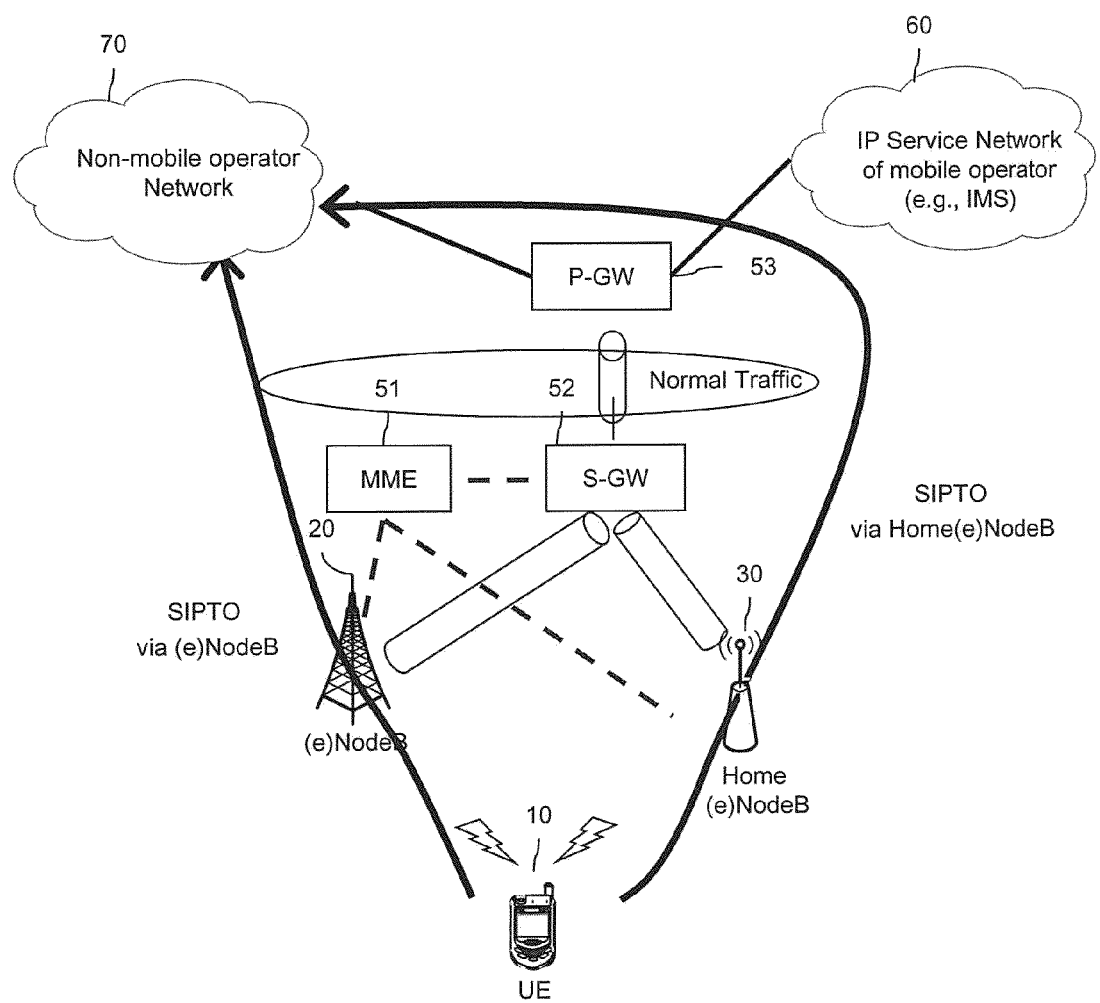
FIG. 4 shows a concept of Selected IP Traffic Offload (SIPTO).

The present invention is described on the basis of a Universal Mobile Telecommunication System (UMTS) and an Evolved Packet Core (EPC), but the present invention is not limited to only the communication systems and can also be applied to all communication systems and methods to which the technical spirit of the present invention can be applied.

Technical terms used in this specification are used to describe only specific embodiments, and it is to be noted that the terms are not intended to limit the present invention. Furthermore, the technical terms used in this specification should be interpreted as having meanings that are commonly understood by a person having ordinary skill in the art to which the present invention pertains, unless especially defined as other meanings in this specification, and should not be interpreted as having excessively comprehensive meanings or excessively reduced meanings. Furthermore, if the technical terms used in this specification are erroneous technical terms that do not precisely represent the spirit of the present invention, they should be replaced with and understood as technical terms that may be correctly understood by a person having ordinary skill in the art. Furthermore, common terms used in the present invention should be interpreted according to the definition of dictionaries or according to the context and should not be interpreted as having excessively reduced meanings.

Furthermore, an expression of the singular number used in this specification includes an expression of the plural number unless clearly defined otherwise in the context. In this application, terms, such as "comprise" and "include", should not be interpreted as essentially including all several elements or several steps described in the specification and should be interpreted as not including some of the elements or steps or as including additional element or steps.

Furthermore, terms including ordinal numbers, such as the first and the second used in this specification, may be used to describe a variety of elements, but the elements should not be limited by the terms. The terms are used to only distinguish one element from the other element. For example, a first element may be named a second element and likewise a second element may be named a first element without departing from the scope of the present invention.

When one element is described as being "connected" or "coupled" with the other element, it should be understood that one element may be directly connected or coupled with the other element, but a third element may be interposed between the two elements. In contrast, when one element is described as being "directly connected" or "directly coupled" with the other element, it should be understood that a third element is not interposed between the two elements.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be interpreted as being limited by the accompanying drawings. The spirit of the present invention should be interpreted as being extended up to all changes, equivalents, and substitutes in addition to the accompanying drawings.

In the accompanying drawings, User Equipment (UE) is illustratively show, but the shown UE may also be referred to as a terminal, Mobile Equipment (ME), or the like. Furthermore, the UE may be a portable device, such as a notebook, a mobile phone, a PDA, a smart phone, or a multimedia device, or may be a device that cannot be carried, such as a PC or a device mounted on a vehicle.

Definition of Terms

Prior to a description with reference to the drawings, terms used in this specification are defined in brief in order to help understanding of the present invention.

UMTS: An abbreviation of a Universal Mobile Telecommunication System, and an UMTS means a 3rd mobile communication network.

EPS: An abbreviation of Evolved Packet System, and an EPS means a core network which supports a Long Term Evolution (LTE) network. An UMTS is an evolved form of network Public Data Network (PDN): An independent network in which a server providing service is placed Access Point Name (APN): The name of an access point managed in a network, which is provided to UE. That is, the APN indicates the name (character string) of a PDN. A corresponding PDN for transmitting and receiving data is determined based on the name of an access point.

Access control: A control procedure for allowing whether or not to allow UE to use an access system, such as a Home (e)NodeB, or moving UE to another access system.

Tunnel Endpoint Identifier (TEID): an endpoint ID of a tunnel set between nodes within a network. The TEID is set in each section in a bearer unit of each terminal.

NodeB: A base station of an UMTS network, which is installed outdoors. The NodeB has cell coverage corresponding to that of a macro cell.

eNodeB: A base station of an Evolved Packet System (EPS), which is installed outdoors. The eNodeB has cell coverage corresponding to that of a macro cell.

e)NodeB: A term that denotes a NodeB and an eNodeB.

Home NodeB: A base station of an UMTS network, which is installed indoors. The Home NodeB has cell coverage corresponding to that of a femto cell.

Home eNodeB: A base station of an EPS network, which is installed indoors. The Home eNodeB has cell coverage corresponding to that of a femto cell.

Home (e)NodeB: A term that denotes a Home NodeB and a Home eNodeB.

Home (e)NodeB gateway: a gateway connected with one or more Home (e)NodeBs and functioning to interface with a core network.

Home (e)NodeB Subsystem: A form in which a wireless network is managed by binding a Home (e)NodeB and a Home (e)NodeB Gateway together as one set. The Home (e)NodeB subsystem and the Home (e)NodeB can be considered to be one set form because they manage a wireless network and function to operate in conjunction with a core network. Accordingly, hereinafter, terms: a Home (e)NodeB and a Home (e)NodeB subsystem are mixed and used.

MME: An abbreviation of a Mobility Management Entity, which functions to control each entity within an EPS in order to provide a session and mobility to UE.

Closed Subscriber Group (CSG): A group of one or more Home (e)NodeBs. Home (e)NodeBs belonging to a CSG have the same CSG ID. Each user receives a use grant according to each CSG.

Closed access mode: It means that a Home (e)NodeB operates as a CSG cell. The closed access mode means that access is allowed for only UE allowed to a corresponding cell. That is, UE having a right to specific CSG IDs supported by a Home (e)NodeB can access the specific CSG IDs.

Open access mode: It means that a Home (e)NodeB operates like a normal cell (or non-CSG cell) without a concept of a CSG. That is, the open access mode means that a Home (e)NodeB operates likes a normal (e)NodeB.

Hybrid access mode: It means that a Home (e)NodeB operates as a CSG cell and allows even a non-CSG subscriber to access thereto. Access is allowed for UE having a specific CSG ID that can be supported for a corresponding cell, Home (e)NodeB service can be provided to the UE, and even UE not having a CSG right is allowed for access.

Selected IP Traffic Offload (SIPTO): Technology in which when UE tries to send specific IP traffic through a Home(e)NodeB or an (e)NodeB, the specific IP traffic is offloaded to a wired network, such as the Internet, not the network (e.g., 3GPP or 3GPP2) of a mobile communication service provider SIPTO femto (or femto SIPTO): Technology in which when UE tries to send specific IP traffic through a Home(e)NodeB, the specific IP traffic is offloaded to a wired network, such as the Internet, not the network (e.g., 3GPP or 3GPP2) of a mobile communication service provider SIPTO macro (or macro SIPTO): Technology in which when UE tries to send specific IP traffic through an (e)NodeB, the specific IP traffic is offloaded to a wired network, such as the Internet, not the network (e.g., 3GPP or 3GPP2) of a mobile communication service provider Local IP Access (LIPA): Technology in which a Home(e)NodeB is connected with a local network (i.e., a small-size network, for example, a home network or a company network) and UE within the Home(e)NodeB is enabled to access a local network through the Home(e)NodeB.

Local gateway: A gateway for enabling LIPA or SIPTO through a Home(e)NodeB, that is, for enabling data to be transmitted over a home network or a wired network directly without passing through a core network. The local gateway is placed between the Home(e)NodeB and the wired network, a bearer is generated between the Home(e)NodeB and the wired network or a bearer is generated between the Home (e)NodeB and a local network, and data is transmitted through the generated bearer.

Session: A session is a passage for data transmission, and a PDN, a bearer, or an IP flow unit can become a unit of the session. A difference between units, as defined in 3GPP, can be classified into the entire target network unit (APN or PDN unit), a unit classified according to QoS (i.e., a bearer unit) within the target network unit, and a target IP address unit.

PDN connection: A connection from UE to a PDN, that is, association (connection) between UE represented as an IP address and a PDN represented as an APN. The PDN connection means a connection (UE-PDN GW) between entities within a core network so that a session can be formed.

UE Context: Condition information for UE which is used to manage the UE in a network, that is, condition information including a UE ID, mobility (a current location, etc.), and the attributes (QoS, priority, etc.) of a session Local PDN: An individual and independent network, such as a home network or a company network, not an external PDN Local Home(e)NodeB network: It means a network for access to a local PDN and includes a Home(e)NodeB and an L-GW.

Local network: A network including a local Home (e)NodeB network and a local PDN DIDA: Technology in which each datum is classified in order to select preference access in the form of data identification for an access network discovery selection function A brief description of technologies proposed in this specification Meanwhile, technologies proposed in this specification are described in brief below.

The present invention proposes technology in which the data of UE is offloaded to a wired network without passing through the core network of a service provider in a mobile communication system based on 3GPP Universal Mobile Telecommunication System (UMTS)/Evolved Packet System (EPS). Furthermore, there are proposed technologies, such as IFOM and MAPCON for supporting multiple radio access. That is, there are proposed technology in which data is transmitted through respective PDN connections for 3GPP access and Wi-Fi access (MAPCON) and technology in which data is transmitted by binding 3GPP access and Wi-Fi access into one PDN or a P-GW.

Furthermore, control over the operations is performed through a core network, a base station, UE or the like.

In this specification, in the technologies, the data of a user is not offloaded to a random network, but a radio access network is selected by taking the type of service, the location of a server, the type of transmitted data, etc. into consideration, and the data of a user is selectively offloaded.

Figure 5:
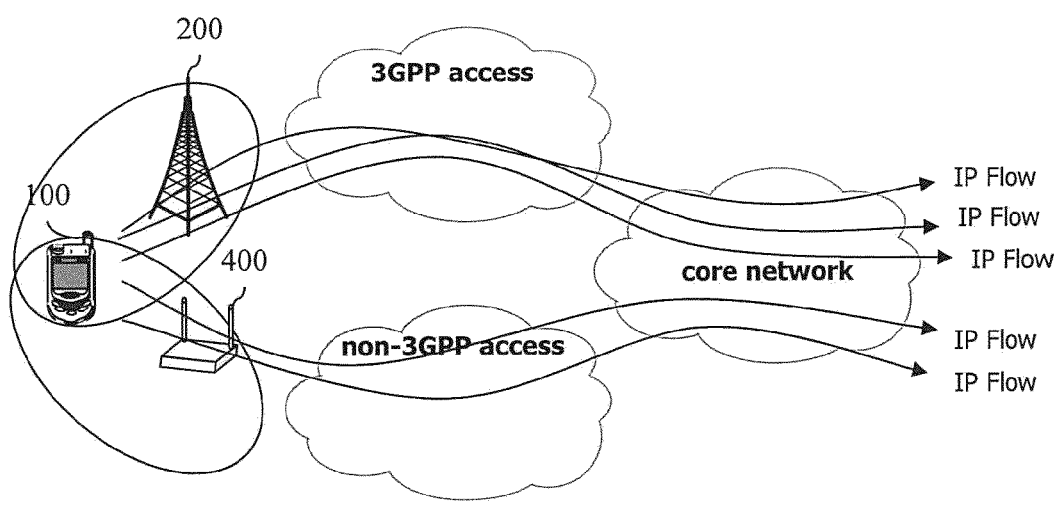
FIG. 5 illustrates an architecture proposed by this specification.

FIG. 5 illustrates an architecture proposed by this specification. FIG. 5 is an exemplary diagram showing an example of IFOM technology.

With an explosive increase of data, 3G mobile communication has reached the critical point. To this end, Long Term Evolution (LTE) is a good alternative.

Accordingly, to offload the data of a user through Wi-Fi in order to reduce the congestion of a core network of a mobile communication service provider is possible at low costs. This is the best method capable of improving the profits of a service provider.

Referring to FIG. 5, in IFOM, the same PDN connection is provided through other several pieces of accesses. Such IFOM provides offloading to a seamless WLAN.

Furthermore, IFOM provides the transfer of the IP flows of the same one PDN connection from one type of access to another type of access.

Figure 6:
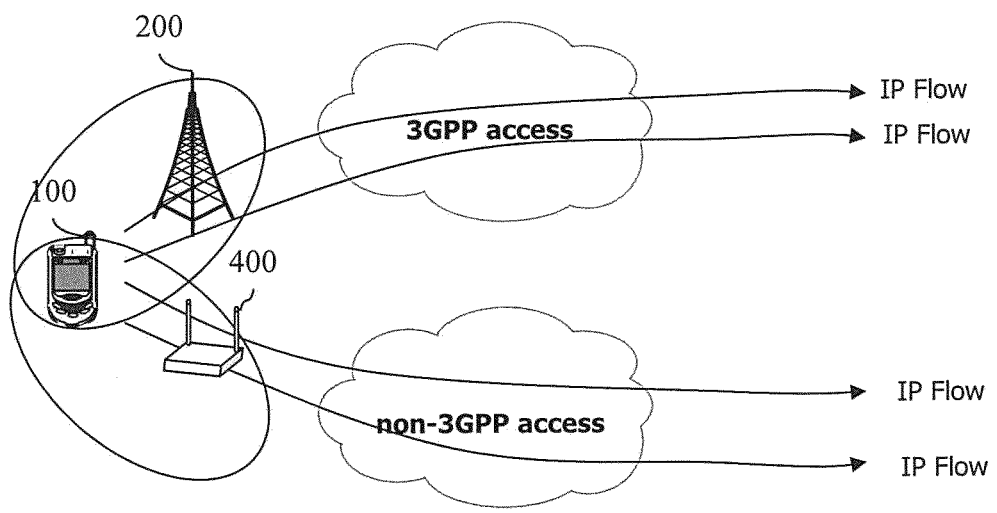
FIG. 6 is an exemplary diagram showing an example of MAPCON technology.

FIG. 6 is an exemplary diagram showing an example of MAPCON technology.

As can be seen with reference to FIG. 6, in MAPCON technology, several PDN connections, easily, IP flows shown in FIG. 6 are connected with other APNs through another access system.

In accordance with such MAPCON technology, UE 100 can generate a new PDN connection on access that has not been used. Alternatively, the UE 100 can generate a new PDN connection in access selected from several types of access that have been previously used. Alternatively, the UE 100 may transfer some of or all PDN connections already connected thereto to another access.

Meanwhile, a service provider may control routing for PDN connections that are activated in several pieces of available access.

Figure 7:
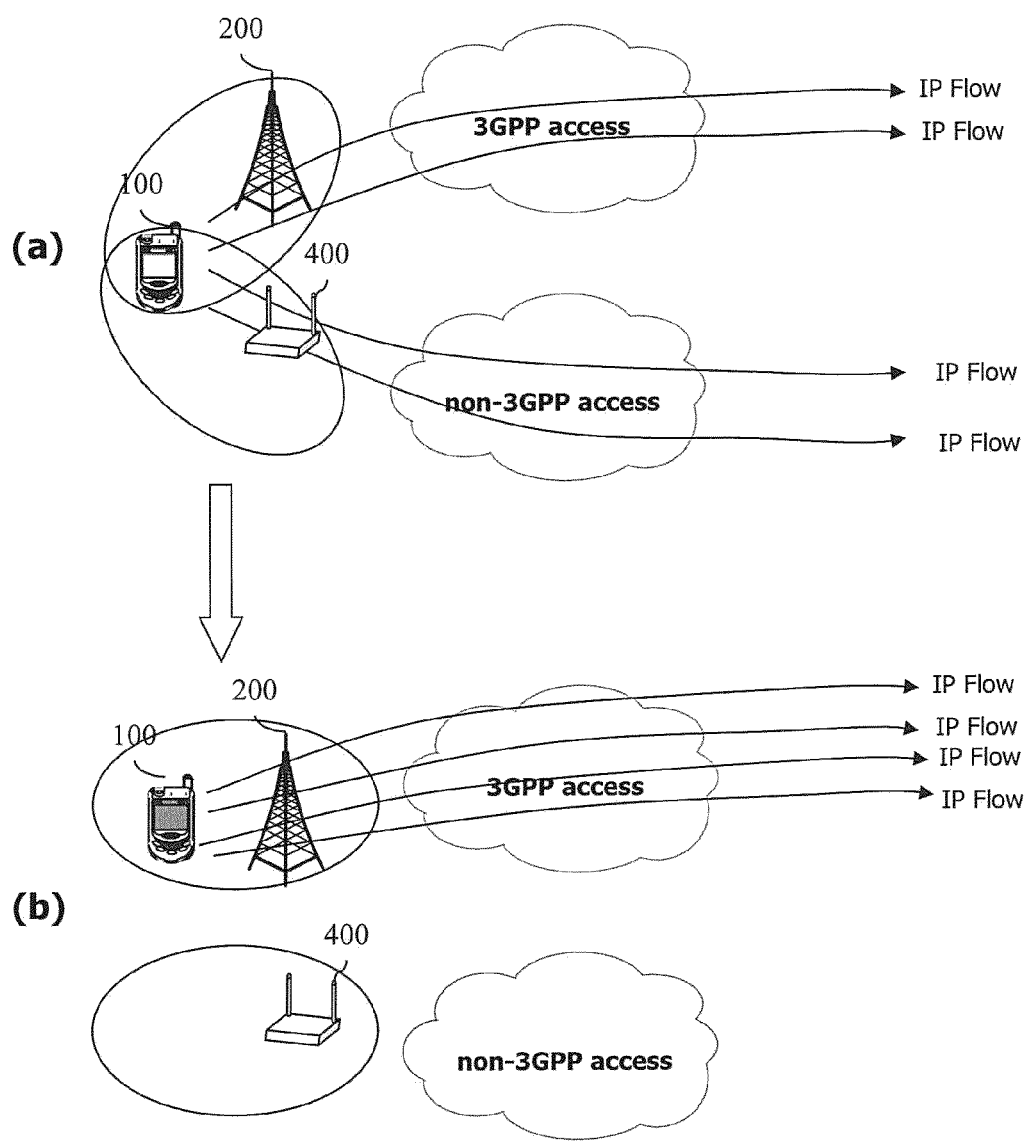
FIG. 7 shows an example of an IP flow according to MAPCON technology.
Figure 8:
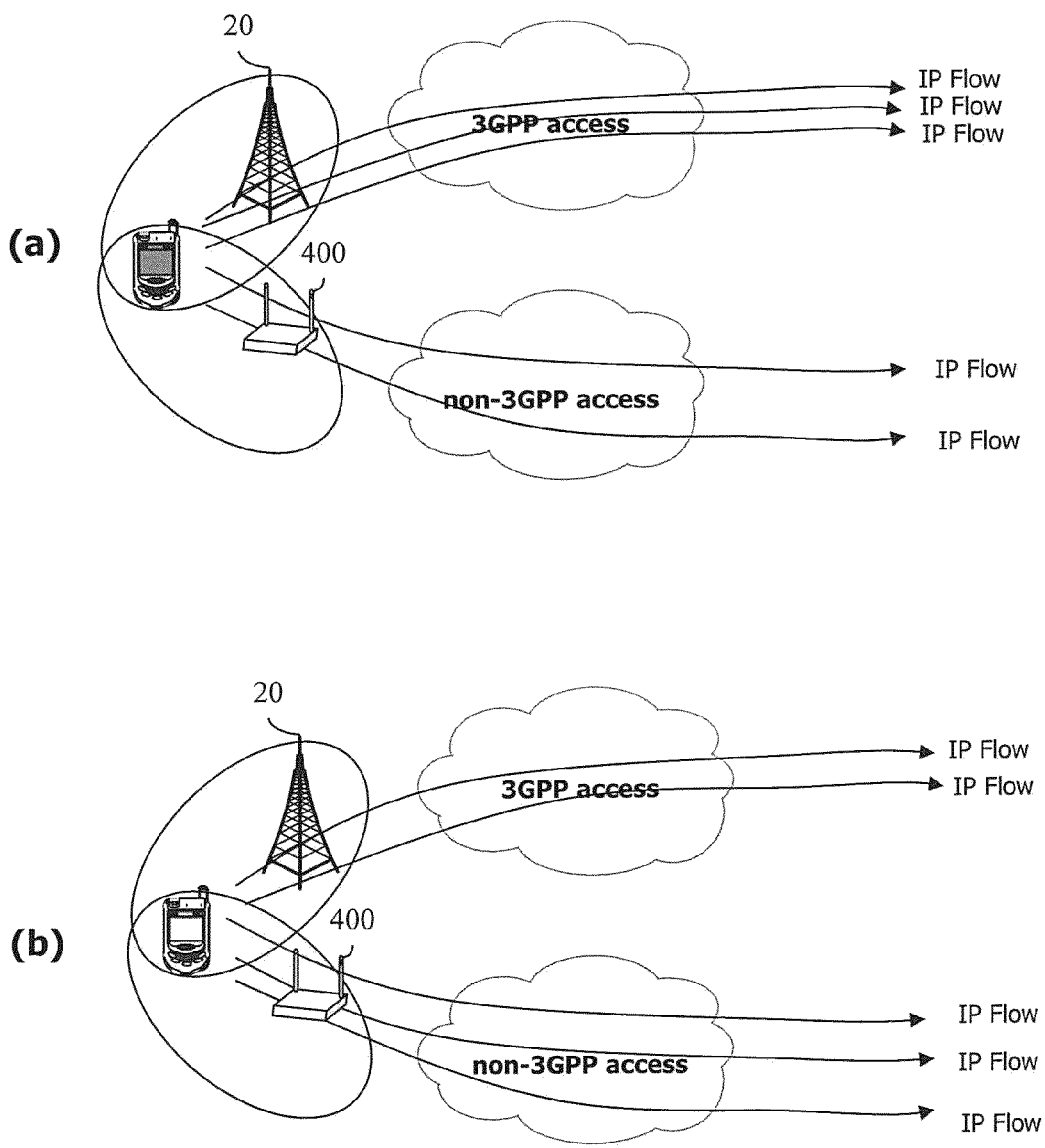
FIG. 8 shows another example of an IP flow according to MAPCON technology.

FIG. 7 shows an example of an IP flow according to MAPCON technology, and FIG. 8 shows another example of an IP flow according to MAPCON technology.

As can be seen with reference to FIG. 7(a), when UE 100 belongs to a base station, for example, both the coverage of an (e)NodeB 200 and the coverage of an AP 400, the UE 100 can transfer several PDN connections, for example, some of IP flows through 3GPP access using the base station, for example, the (e)NodeB 200 and transfer some IP flows through non-3GPP access using the AP 400.

For example, the UE 100 can transfer a connection for a voice call that requires a real-time property or a connection for data that requires reliability through 3GPP access using the base station, for example, the (e)NodeB 200 and transfer a connection for video data that does not require a real-time property or a connection for normal data that does not require reliability through non-3GPP access using the AP 400.

Meanwhile, if the UE 100 deviates from the coverage of the AP 400 as shown in FIG. 7(b), a connection through non-3GPP access using the AP 400 can be changed so that the connection passes through 3GPP access using the base station, for example, the (e)NodeB 200.

Meanwhile, as can be seen with reference to FIG. 8(a), the UE 100 can transfer a connection for specific data through 3GPP access using a base station, for example, an (e)NodeB 200 and transfer a connection for other data through non-3GPP access using the AP 400.

As can be seen with reference to FIG. 8(b), UE 100 may change some connections through 3GPP access using a base station, for example, an (e)NodeB 200 so that the some connections pass through non-3GPP access using the AP 400. That is, the UE can transfer the connections.

Figure 9:
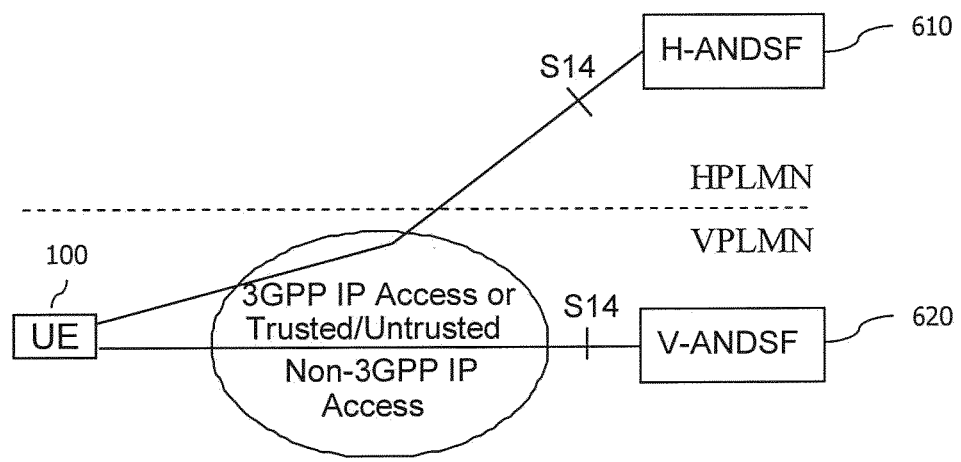
FIG. 9 shows a network control entity for providing IFOM or MAPCON.

FIG. 9 shows a network control entity for providing IFOM or MAPCON.

As can be seen with reference to FIG. 9, a network control entity for providing IFOM or MAPCON, that is, an ANDSF, may be present in the Home PLMN (hereinafter referred to as an 'HPLMN') of UE 100 or in a Visited PLMN (hereinafter referred to as a 'VPLMN').

The ANDSF performs a network discovery function and a data management and control function for providing selected assistance data according to a service provider policy.

The ANDSF may respond to a request from UE regarding access network discovery information and also transmit information if necessary although there is no request from UE.

The ANDSF can provide information about an inter-system mobility policy, information for access network discovery, and information about inter-system routing, for example, a routing rule.

The information about routing, for example, the routing rule can include AccessTechnology, AccessId, AccessNetworkPriority, and so on.

Technology 'ANDSF' has started as technology for providing a policy for a movement between heterogeneous networks. Today, in this technology, if several types of radio access are possible, preference can be determined and radio access can be selected based on the determined preference so that data can be transmitted.

When taking the evolution direction of recent UE, the requirements of a service provider, etc. into consideration, the type of service or various conditions may be taken into consideration in order to determine a routing policy for data.

Types of categories that can be now supported are as follows.
  A PDN identifier (i.e., APN) used by UE for a given connection
  A target IP address at which UE sends traffic
  A target port number used by UE for a connection
  A combination of the 3 elements
The four types have been proposed as described above.

They are insufficient to satisfy various scenario. Accordingly, there is a need for a supplement to the types.

In other words, it is necessary to supplement the ANDSF so that network resources used for each application or IP flow can be controlled better.

This is described as follows below.

A scheme for supplement the ANDSF may include a scheme for adding data classification categories. This is described as follows below.

First, an ANDSF functions to provide UE with policy information so that the UE can operate when accessing the home network of a service provider or a visited network (V-ANDSF), such as (H-ANDSF) roaming.

Accordingly, the ANDSF includes information about data classification in the policy information and provides the policy information to the UE. The UE selects radio access or a network interface (PDN connection) according to at least one of the data classification information, included in the policy information, and several criteria. Here, a criterion for the selection can be determined with reference to policy data, such as the Inter-System Routing Policy (ISRP) of the ANDSF. A current format is as follows. An indication <X> means an extension and is a form that continues to be hierarchically extended.

Categories that are now applied basically include ForFlowBased and ForServiceBased. For example, for ForFlowbased, if an address type and a range of address range port numbers of a source and target are determined and TimeOfDay of RoutingCriteria is determined to 3 o'clock-6 o'clock, it means that data transmitted within the corresponding address range is transmitted to a specific APN between 3 o'clock and 6 o'clock. It means that corresponding data is transmitted through predetermined access according to priority or the configuration of a service provider/UE.

TABLE 1

<X>/ISRP/
<X>/ISRP/<X>
<X>/ISRP/<X>/RulePriority
<X>/ISRP/<X>/ForFlowBased
<X>/ISRP/<X>/ForFlowBased/<X>/
<X>/ISRP/<X>/ForFlowBased/<X>/IPFlow
<X>/ISRP/<X>/ForFlowBased/<X>/IPFlow/<X>/
<X>/ISRP/<X>/ForFlowBased/<X>/IPFlow/<X>/AddressType
<X>/ISRP/<X>/ForFlowBased/<X>/IPFlow/<X>/StartSourceIPaddress
<X>/ISRP/<X>/ForFlowBased/<X>/IPFlow/<X>/EndSourceIPaddress
<X>/ISRP/<X>/ForFlowBased/<X>/IPFlow/<X>/StartDestIPaddress
<X>/ISRP/<X>/ForFlowBased/<X>/IPFlow/<X>/EndDestIPaddress
<X>/ISRP/<X>/ForFlowBased/<X>/IPFlow/<X>/ProtocolType
<X>/ISRP/<X>/ForFlowBased/<X>/IPFlow/<X>/StartSourcePortNumber
<X>/ISRP/<X>/ForFlowBased/<X>/IPFlow/<X>/EndSourcePortNumber
<X>/ISRP/<X>/ForFlowBased/<X>/IPFlow/<X>/StartDestPortNumber
<X>/ISRP/<X>/ForFlowBased/<X>/IPFlow/<X>/EndDestPortNumber
<X>/ISRP/<X>/ForFlowBased/<X>/IPFlow/<X>/QoS
<X>/ISRP/<X>/ForFlowBased/<X>/RoutingCriteria
<X>/ISRP/<X>/ForFlowBased/<X>/RoutingCriteria/<X>/
<X>/ISRP/<X>/ForFlowBased/<X>/RoutingCriteria/<X>/ValidityArea
<X>/ISRP/<X>/ForFlowBased/<X>/RoutingCriteria/<X>/TimeOfDay
<X>/ISRP/<X>/ForFlowBased/<X>/RoutingCriteria/<X>/APN
<X>/ISRP/<X>/ForFlowBased/<X>/RoutingRule
<X>/ISRP/<X>/ForServiceBased
<X>/ISRP/<X>/ForServiceBased/<X>/
<X>/ISRP/<X>/ForServiceBased/<X>/APN
<X>/ISRP/<X>/ForServiceBased/<X>/RoutingCriteria
<X>/ISRP/<X>/ForServiceBased/<X>/RoutingCriteria/<X>/
<X>/ISRP/<X>/ForServiceBased/<X>/RoutingCriteria/<X>/ValidityArea
<X>/ISRP/<X>/ForServiceBased/<X>/RoutingCriteria/<X>/TimeOfDay
<X>/ISRP/<X>/ForServiceBased/<X>/RoutingRule The categories proposed so far are limited to the above categories. That is, precise data of address information and the port number of service are predetermined.

Furthermore, if an Internet PDN is used, it is difficult to distinguish data characteristics from each other, and it is usually difficult to be aware of specific information, such as QoS, in advance. In this case, it is difficult to apply the categories effectively.

In particular, in view of a current user usage form or frequency, data transferred over an Internet PDN is greatly increased even in a mobile environment. For example, Internet data is provided in the form of a web-based document that uses an http protocol through a service provider, such as Google or YouTube. The Internet data can include various media.

If http is used, the same port is used. In the existing technology, if several media are used in one port, individual processing is impossible. That is, media formats include video, audio, text, an application (player), etc. MAPCON/IFOM/SIPTO, etc. developed by Rel-10 can be effectively used only when the data is classified.

Accordingly, there is a need for several categories for classifying data in addition to the existing port number or protocol type.

Accordingly, this specification proposes a media type (content type), a domain name, and a transmission type in order to classify data so that data can be effectively classified into several categories within a PDN and a transmission interface (radio access or an APN) can be properly selected.

To this end, this specification proposes that one of at least 3 categories be added. First, a category for a media type may be added. Second, a category for a domain name may be added. Third, a category for a transmission type may be added.

That is, a category for a media type can be added as follows.

<X>/MediaType

Such a category may be placed at the top, but may be placed in FlowBased or ServiceBased. That is, the category of the media type may be present within FlowBased or ServiceBased as IPFlow or a routing rule 'RoutingCriteria'. For example, the category of the media type is as follows.

TABLE 2

| <X>/ISRP/<X>/ForFlowBased/<X>/IPFlow/<X>/MediaType |
| <X>/ISRP/<X>/ForServiceBased/<X>/RoutingCriteria/<X>/MediaType |

Here, the element MediaType can be defined as one or more of several media types defined in the Multipurpose Internet Mail Extensions (MIME) type. For example, the media type MediaType can be one or more of Type application, Type audio, Type image, Type message, Type model, Type multipart, Type text, Type video, Type vnd, and Type x.

For example, if a target address is 10.10.10.1~10.10.10.9 and transmission is performed over an "internet_wifi" PDN in the case of video media, an example of definition according to each flow is shown in the following table.

TABLE 3

| <X>/ISRP/<X>/ForFlowBased/<X>/IPFlow/<X>/ |
| <X>/ISRP/<X>/ForFlowBased/<X>/IPFlow/<X>/AddressType |
| ... |
| <X>/ISRP/<X>/ForFlowBased/<X>/IPFlow/<X>/StartDestIPaddress =10.10.10.1 |
| <X>/ISRP/<X>/ForFlowBased/<X>/IPFlow/<X>/EndDestIPaddress= 10.10.10.9 |
| <X>/ISRP/<X>/ForFlowBased/<X>/IPFlow/<X>/EndDestPortNumber=8000 |
| <X>/ISRP/<X>/ForFlowBased/<X>/IPFlow/<X>/MediaType = "video" |
| <X>/ISRP/<X>/ForFlowBased/<X>/IPFlow/<X>/QoS |
| <X>/ISRP/<X>/ForFlowBased/<X>/RoutingCriteria |
| <X>/ISRP/<X>/ForFlowBased/<X>/RoutingCriteria/<X>/ |
| <X>/ISRP/<X>/ForFlowBased/<X>/RoutingCriteria/<X>/APN="internet_wifi" |

First, the addition of a new category for a media type is described below.

For another example, an example of definition when an APN is "internet_3gpp" in the case of audio data is as follows.

TABLE 4

| <X>/ISRP/<X>/ForServiceBased/<X>/ |
| <X>/ISRP/<X>/ForServiceBased/<X>/APN= "internet_3gpp" |
| <X>/ISRP/<X>/ForServiceBased/<X>/RoutingCriteria |
| <X>/ISRP/<X>/ForServiceBased/<X>/RoutingCriteria/<X>/ |
| <X>/ISRP/<X>/ForServiceBased/<X>/RoutingCriteria/<X>/MediaType="audio" |

The following categories can be combined with several categories within an ISRP, that is, subcategories, such as IPFlow, RoutingCriteria, and RoutingRule, or other several categories and can be used to classify data.

It is assumed that IFOM is supported when a user accesses YouTube over an Internet PDN. Here, in YouTube, a video player, video, related text documents, and sync data are transmitted. Here, if media are classified and transmitted according to a user's preference or a policy of a service provider, the same effects can be obtained at the lowest cost. That is, video can be transmitted over a wired network, text can be transmitted over a mobile network, and the video and text can be combined and played back.

In order to implement this, the data needs to be classified according to media types. The data can be classified by adding a category according to a media type to ISRP.

Meanwhile, as described above, second, the addition of a domain name category is described as follows.

The domain name can be a Fully Qualified Domain Name (FQDN).

A category for a domain name can be added as follows.

<X>/domain_name

It is to be noted that when the Internet is used, a server is accessed, update may be performed every time because the address of a corresponding server can be dynamically allocated.

Several servers are managed in the case of a portal. This becomes a cause of an address change. Furthermore, if a server name serves other several servers in one domain, a configuration for each server needs to be configured. That is, such a configuration includes www.yahoo.com, blog.yahoo- .com, weather.yahoo.com, etc. In this case, it can be briefly defined by a method, such as *.yahoo.com.

For example, in the case of all server of a target *.naver.com, video media, and transmission over "internet_wifi" PDN, definition according to each flow is as follows.

TABLE 5

<X>/ISRP/<X>/ForFlowBased/<X>/IPFlow/<X>/
<X>/ISRP/<X>/ForFlowBased/<X>/IPFlow/<X>/AddressType
. . .
<X>/ISRP/<X>/ForFlowBased/<X>/IPFlow/<X>/domain_name=*.naver.com
<X>/ISRP/<X>/ForFlowBased/<X>/IPFlow/<X>/MediaType = "video"
<X>/ISRP/<X>/ForFlowBased/<X>/IPFlow/<X>/QoS
<X>/ISRP/<X>/ForFlowBased/<X>/RoutingCriteria
<X>/ISRP/<X>/ForFlowBased/<X>/RoutingCriteria/<X>/
<X>/ISRP/<X>/ForFlowBased/<X>/RoutingCriteria/<X>/
APN="internet_wifi"

Third, the addition of a category for a transmission type is described below.

The category of the transmission type can be added according to the following format.

<X>/TransmissionType

A media transmission method can be classified into streaming, downloading, etc. The media transmission method can be classified according to an application or specific service. In the case of streaming, the selection of radio access is important because it is excellent when streaming is not stopped in terms of a service characteristic and user experience.

The element TransmissionType can be streaming, downloading, a short message, etc.

The transmission type category may be placed at the top, but may be placed in FlowBased or ServiceBased. That is, the category of the media type may be present as IPFlow or a routing rule (RoutingCriteria) within FlowBased or ServiceBased.

For example, the category of the media type can be added as follows.

TABLE 6

<X>/ISRP/<X>/ForFlowBased/<X>/IPFlow/<X>/TransmissionType In contrast, in order for UE to select a preferred interface for sending data, Wi-Fi, Wimax, and cellular (LTE or UMTS, HSPA) need to become candidates for the preferred interface. In the case of cellular communication, several APNs can generate various paths, such as a fixed network and a mobile communication network. Accordingly, APN information or each piece of the above-described access may be added to the routing rule. All the candidates may be represented using a separate category. This is as follows, for example.

<X>/ISRP/<X>/ForFlowBased/<X>
<X>PreferredRouteing<X.>InterfaceType={Wi-Fi, Wimax, LTE, UMTS, HSPA or APN_name}

In contrast, UE receives the above ISRP information through an ANDSF. Here, the UE can perform several types of radio access, such as access through WIFI or a femto cell and access through a macro cell (LTE, 3G, etc.). When sending data, the UE classifies contents of each ISRP according to a criterion, selects a preferred interface, and sends the data through a corresponding PDN connection (a network path defined by an APN) or corresponding access based on the selection.

For example, the Internet was conventionally used through one PDN. If offloading to another access is possible, a configuration is possible so that some data is offloaded to another access and important data is served over a mobile communication network.

That is, when a target server name indicates a bank, etc., a corresponding flow can be transmitted over a mobile communication network, and the remaining flows can be transmitted over a fixed network. In the case of a media (content) type, video data can be transmitted over Wi-Fi, and the remaining data can be transmitted over a mobile network.

UE can classify data by performing a packet check, a meta data check, and filtering.

First, performing a packet check is described as follows.

Each category can be indicated within a packet or over a packet header part. Or, UE can check a category added within a packet or a packet header by an application. That is, since parts corresponding to a media type, a domain name, and a transmission type can be recorded on respective packets, whether the media type, the domain name, and the transmission type belong to what categories can be checked by reading the respective packets when sending data. This may be configured in an API form.

As another scheme, meta data can be checked as described above. This is because an application or a platform (refer to an OS) can be aware of the pieces of information. For example, a media type is recorded on the header of a media file to be transmitted, and an application can be aware of information about the media type by parsing and reading a header. The media type is information that can be aware when an application opens a file or control signals, pieces of content information, and pieces of media information are exchanged between a server and a client. That is, when the server sends the file to the client, the server can be aware that the file includes what media or whether downloading/streaming are possible or not. When UE collects the pieces of information, the information is transferred to the UE using a method, such as an API. For example, when a target address and media types are transferred to UE, all packets corresponding to the target address send data through preferred access or over a PDN according to the criteria of an ISRP. Here, a corresponding server can be accessed again, if necessary, through the preferred access or over the PDN, and a path can be changed.

As another scheme, a scheme for performing filtering as described above is described below.

For example, if a category for a content type is to be added as described above, data corresponding to one or more of the following cases is classified and transmitted through preferred access.

All data (packets, files, etc.) generated by all applications including corresponding content
The entire traffic (a packet level) including corresponding content
Media data (data, such as a file) corresponding to corresponding content Furthermore, if several categories are applied, filtering can be performed using a method, such as AND/OR.

That is, more various rules can be produced by applying an AND/OR concept.

To this end, a rule can be described using logical operators of AND and OR. For example, the rule can be as follows.

Example)<X>/ISRP/<X>/ForFlowBased/<X>/IPFlow/<X>/MediaType AND Application id

For example, an example in which filtering is performed based on a target domain is described below.

When UE receives information about www.example.com within an IP filter and an ISRP having a WLAN as preferred access technology, the UE can transfer the entire traffic toward to www.example.com over a WLAN.

A combination of other IP filters is also possible. For example, a service provider may perform a configuration so that only data toward a specific port of www.example.com is transmitted over a WLAN.

In contrast, an ISRF based on an application is also possible. In this case, an ID of the application can be used.

For example, when UE receives an ISRP including an ID of an application within a filter, the UE can direct all data, generated from applications having the ID, toward a WLAN, for example.

In contrast, when UE receives an ISRP including a content type within a filter, the UE can direct data having the content type toward a WLAN, for example.

Figure 10:
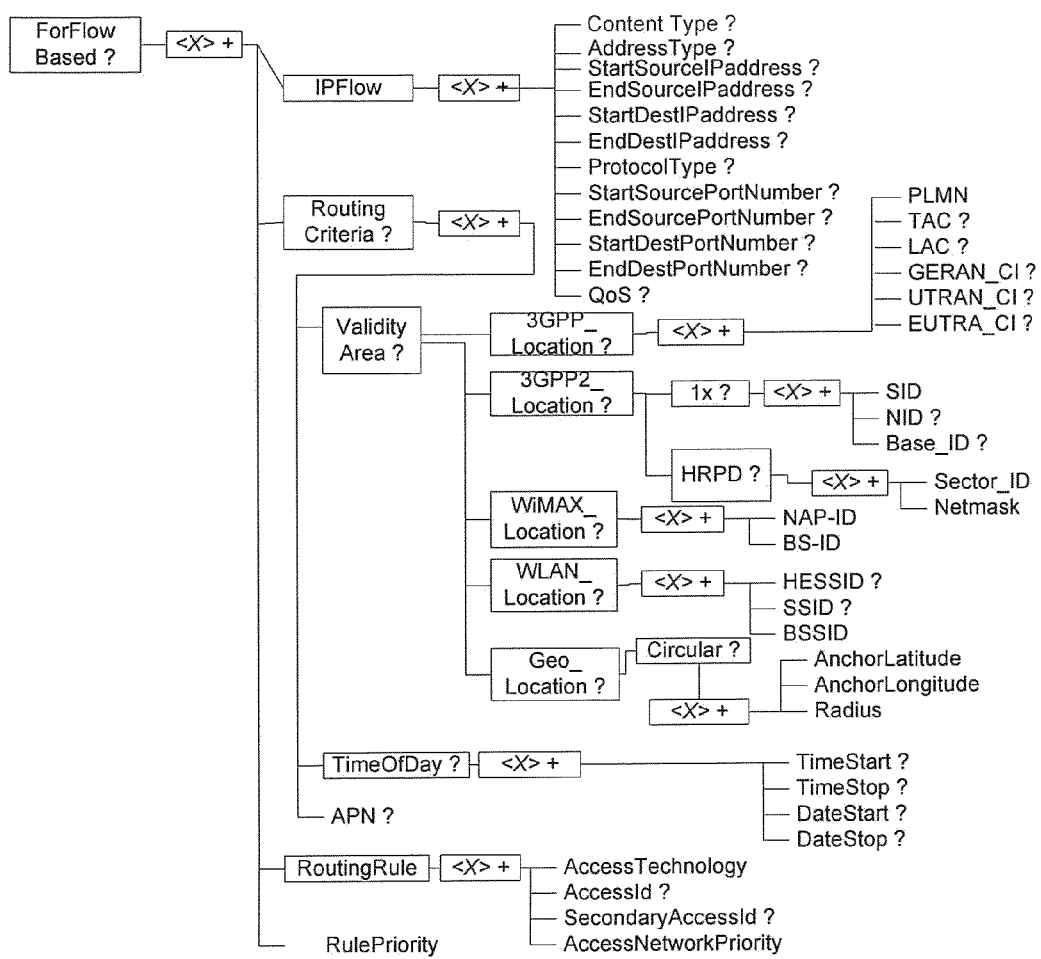
FIG. 10 shows an example in which categories are newly added.

FIG. 10 shows an example in which categories are newly added.

As can be seen with reference to FIG. 10, the flow-based rule can include IPFlow node, Routing Criteria node, Routing Rule node, and Rule priority node. A Content type node can be newly added to the IPFlow node. Furthermore, the IPFlow node can further include Address Type node, Start Source IP address node, End source IP address node, Start Dest IP address node, End Dest IP address node, Protocol Type node, Start Source Port Number node, End Source Port Number node, Start Dest Port Number node, End Dest Port Number node, and Qos node.

The Routing Criteria node can include Validity Area node, Time of Day node, and APN node.

Figure 11:
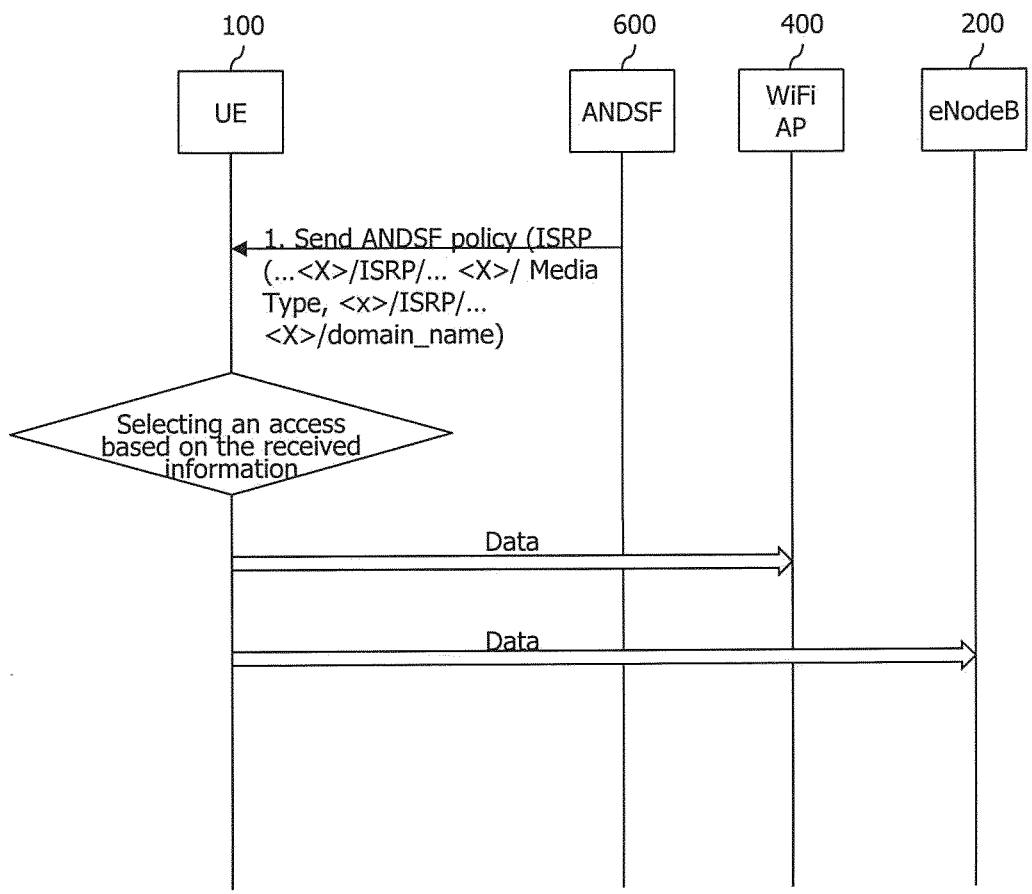
FIG. 11 shows a network control entity for providing IFOM or MAPCON.

FIG. 11 shows a network control entity for providing IFOM or MAPCON.

As can be seen with reference to FIG. 11, an ANDSF 600 transfers configuration information, that is, an ISRP, to UE 100. Here, one or more of a media type, a domain name, and a transmission type newly proposed by the present invention can be added to the configuration information and transmitted. For example, as shown, <X>/ISRP/ ... <X>/MediaType or <X>/ISRP/ ... <X>/domain_name, and <X>/ISRP/ ... <X>/TransmissionType can be added to the configuration information.

The UE 100 generates data through an application operation. The application or a platform (OS) thereof transfers an application ID, a media type (i.e., content type), a transmission type, and address information about an FQDN form to the UE.

The UE 100 classifies the data using the received configuration information, for example, a category of the ISRP. The UE selects corresponding access or PDN connection (APN). Here, the UE 100 classifies pieces of IP flow traffic into detailed classes based on the received configuration information and selects and sends access or a PDN suitable for the classified data.

That is, even when the same APN use two types of access, data can be classified according to their categories and transferred through preferred access. If new access is possible after a movement, data can be transferred through the new access according to priority or preference. In this case, the data is classified into specific classes by taking each application or the attributes of data (a content type, a media type, a transfer address, etc.) into consideration, and an interface thereof, that is, WIFI or an APN, is described by taking the classified classes and possible access into consideration.

The UE 100 sends data through corresponding access based on the determination.

Figure 12:
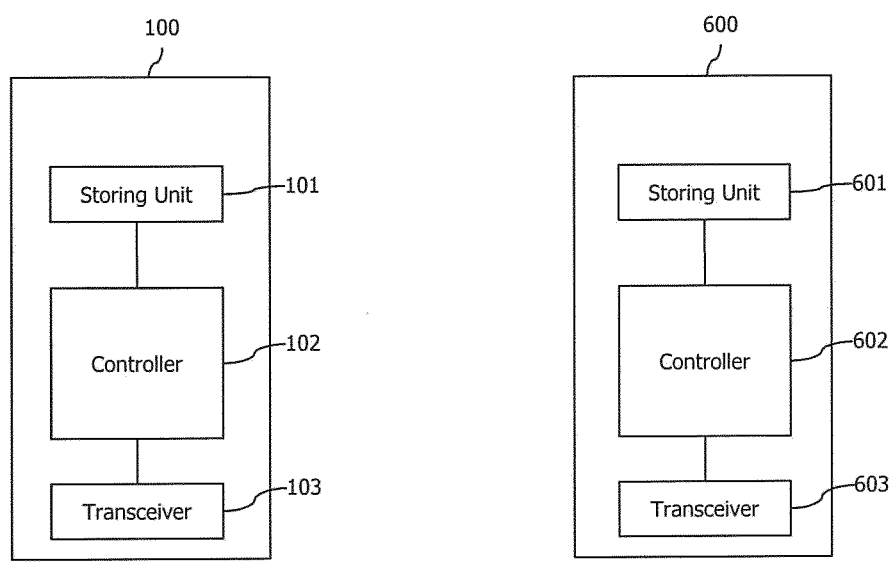
FIG. 12 is a block diagram showing the construction of UE 100 and an ANDSF 600 according to the present invention.

FIG. 12 is a block diagram showing the construction of UE 100 and an ANDSF 600 according to the present invention.

As described above, the ANDSF 600 can transfer a list of ISRPs to the UE.

The ISRP can include pieces of the following information.
Validity information,
Information for IFOM: It may include one filter rule or a plurality of filter rules. Each filter rule can include preferred access technology/information about an access network. Traffic matched with IP filter rules that is specific to a specific APN or a specific APN can be matched with the filter.
Traffic offloading to a WLAN having non-seamless continuity: one or a plurality of filter rules can offload traffic, corresponding to specific IP filters, to a WLAN having non-seamless continuity.

Meanwhile, as shown in FIG. 12, the UE 100 includes a storing unit 101, a controller 102, and a transceiver 103. Furthermore, the ANDSF 600 includes a storing unit 601, a controller 602, and a transceiver 603.

The storing units 101 and 601 store the methods shown in FIGS. 5 to 10.

The controllers 102 and 112 control the storing units 101 and 601 and the transceivers 103 and 603. More particularly, the controllers 102 and 602 execute the methods stored in the respective storing units 101 and 601. Furthermore, the controllers 102 and 602 send the above-described signals through the respective transceivers 103 and 603.

Although the preferred embodiments of the present invention have been illustratively described, the scope of the present invention is not limited to only the specific embodiments, and the present invention can be modified, changed, or improved in various forms within the spirit of the present invention and within a category written in the claims.

The invention claimed is:

1. A method in user equipment supporting multiple radio access technology, the method comprising:
    receiving an inter-system routing policy (ISRP) from a server, the ISRP including filter rule information, and the filter rule information including content type information and a list in which access technologies or access networks supported by the user equipment are classified according to priorities,
    wherein the content type information specifies one or more of a single audio, a single video, a single text and an application data including a combination of an audio, a video and a text;
    parsing a meta data in a header portion of data traffics to be transmitted thereby deciding which one or more among the single audio, the single video, the single text and the application data are included in the data traffics;
    classifying the data traffics based on the checked meta data and the content type information;
    determining each access technology or network for each data traffic, which is matched with the content type information of the filter rule information;
    if a first data traffic includes only one of the single audio, the single video and the single text, transmitting the data traffic through a first access technology or network; and
    if a second data traffic includes the application data including the combination of the audio, the video and the text, transmitting the second data traffic through a second access technology or network,
    wherein the each data traffic is transferred using an Access Point Name (APN) defined in the ISRP.

2. The method of claim 1, wherein the access technology or the access network is either a mobile communication network or a Wi-Fi network.

3. The method of claim 1, wherein the server is an Access Network Discovery and Selection Function (ANDSF) server.

4. The method of claim 1, wherein the filter rule information is defined per IP flow, the IP flow being a unit of a session for data transmission.

5. A user equipment supporting multiple radio access technology, comprising:
- a receiver;
- a transmitter; and
- a controller operatively connected to the receiver and the transmitter, the controller configured to:
  - receive an inter-system routing policy (ISRP) from a server, the ISRP including filter rule information, and the filter rule information including content type information and a list in which access technologies or access networks supported by the user equipment are classified according to priorities,
  - wherein the content type information specifies one or more of a single audio, a single video, a single text and an application data including a combination of an audio, a video and a text;
  - parse a meta data in a header portion of data traffics to be transmitted thereby deciding which one or more among the single audio, the single video, the single text and the application data are included in the data traffics;
  - classify the data traffics based on the checked meta data and the content type information;
  - determine each access technology or network for each data traffic, which is matched with the content type information of the filter rule information;
  - if a first data traffic includes only one of the single audio, the single video and the single text, transmit the data traffic through a first access technology or network; and
  - if a second data traffic includes the application data including the combination of the audio, the video and the text, transmit the second data traffic through a second access technology or network,
  - wherein the each data traffic is transferred using an Access Point Name (APN) defined in the ISRP.

6. The user equipment of claim 5, wherein the access technology or the access network is either a mobile communication network or a Wi-Fi network.

7. The user equipment of claim 5, wherein the server is an Access Network Discovery and Selection Function (ANDSF) server.

8. The user equipment of claim 5, wherein the filter rule information is defined per IP flow, the IP flow being a unit of a session for data transmission.

* * * * *